(12) United States Patent
Lozano

(10) Patent No.: US 10,706,583 B2
(45) Date of Patent: Jul. 7, 2020

(54) SYSTEM AND METHOD FOR AERIAL REFUELING

(71) Applicant: Defensya Ingenieria Internacional, S.L., Madrid (ES)

(72) Inventor: Alberto Adarve Lozano, Madrid (ES)

(73) Assignee: Defensya Ingenieria Internacional, S.L., Madrid (ES)

( * ) Notice: Subject to any disclaimer, the term of this patent is extended or adjusted under 35 U.S.C. 154(b) by 131 days.

(21) Appl. No.: 15/778,017

(22) PCT Filed: Nov. 28, 2016

(86) PCT No.: PCT/ES2016/070843
§ 371 (c)(1),
(2) Date: May 22, 2018

(87) PCT Pub. No.: WO2017/093584
PCT Pub. Date: Jun. 8, 2017

(65) Prior Publication Data
US 2018/0350104 A1   Dec. 6, 2018

(30) Foreign Application Priority Data

Nov. 30, 2015   (ES) .................................. 201531734

(51) Int. Cl.
*G06T 7/73* (2017.01)
*B64D 39/00* (2006.01)
(Continued)

(52) U.S. Cl.
CPC .............. *G06T 7/75* (2017.01); *B64D 39/00* (2013.01); *B64D 39/02* (2013.01);
(Continued)

(58) Field of Classification Search
CPC ........ B64D 39/00; B64D 45/005; G06T 7/75; G06T 19/00
See application file for complete search history.

(56) References Cited

U.S. PATENT DOCUMENTS 5,530,650 A    6/1996   Biferno et al.
5,904,729 A *  5/1999   Ruzicka ................. B64D 39/00
                                             244/135 A
(Continued)

OTHER PUBLICATIONS

International Search Report for Application PCT/ES2016/070843 dated Feb. 10, 2017.

*Primary Examiner* — John J Lee
(74) *Attorney, Agent, or Firm* — Honigman LLP

(57) ABSTRACT

A system for detecting the tube tip of the flying boom of a tanker aircraft and the receptacle mouth of the receiver for semi-automatic or automatic contact for in-flight aerial refueling with a boom, which does not incorporate signaling devices installed on the receiver aircraft, wherein the system and associated method are robust and ensure that the tanker boom control system is provided with real-time, robust, reliable and simultaneous information, from the tip of the tube thereof and from the receiver aircraft's receptacle mouth, at all times. To this end, the system comprises: 1) light emitters mounted on the tip of the tube thereof, 2) a processing subsystem and 3) two 3D cameras, including a TOF camera or a DOE-type camera (or both), as well as at least one laser L to provide them with their specific functionality.

14 Claims, 1 Drawing Sheet

(51) Int. Cl.
　　　*G06T 19/00*　　　(2011.01)
　　　*G06T 7/20*　　　(2017.01)
　　　*G06T 7/521*　　　(2017.01)
　　　*H04N 13/239*　　　(2018.01)
　　　*B64D 39/02*　　　(2006.01)
　　　*B64D 45/00*　　　(2006.01)
　　　*G01S 17/10*　　　(2020.01)

(52) U.S. Cl.
　　　CPC .......... *B64D 45/0005* (2013.01); *G01S 17/10* (2013.01); *G06T 7/20* (2013.01); *G06T 7/521* (2017.01); *G06T 19/00* (2013.01); *H04N 13/239* (2018.05); *G06T 2207/10012* (2013.01); *G06T 2207/10028* (2013.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 6,752,357 | B2 | 6/2004 | Thal et al. |
| 7,469,863 | B1 | 12/2008 | Speer |
| 2003/0205643 | A1* | 11/2003 | von Thal ............... B64D 39/00 244/135 A |
| 2007/0023575 | A1 | 2/2007 | von Thal et al. |
| 2011/0147528 | A1 | 6/2011 | Adarve Lozano |
| 2019/0031347 | A1* | 1/2019 | Duan ................... B64C 39/024 |

\* cited by examiner

SYSTEM AND METHOD FOR AERIAL REFUELING

TECHNICAL FIELD

This invention relates to refueling and more particularly relates to aerial refueling.

BACKGROUND

Refueling operations using a flying boom, or simply boom, require that the tip of the tube, which is in its interior and which dispenses the fuel (called dispensing nozzle), be inserted in a receptacle mounted on the upper surface of the receiver aircraft, wherein the fuel receiver mouth is located. Once contact has been established, which consists of introducing said boom tube tip nozzle, of the tanker aircraft, into the mouth of the receptacle of the receiver aircraft, the fuel will be supplied (after engaging with the receiver's receptacle by means of contactor hooks attached to said nozzle).

The major advantage of boom refueling is, on the one hand, the higher transfer rate achieved (and, thus, shorter refueling time) and, on the other, the workload of the receiver aircraft's pilot, which is smaller than in the case of probe-and-drogue, where the pilot is directly responsible for the operation. In the latter probe-and-drogue method, the receiver aircraft's pilot is almost exclusively responsible for establishing contact.

The operation with a boom is less stressful for the receiver aircraft's pilot, which merely consists of being in an adequate position with respect to the tanker aircraft. Performing the aforementioned operation with a boom requires knowing, at any given time, the positions of both the tube tip (i.e. of the nozzle) and of the receptacle mouth. Said information is currently acquired visually by the operator in charge of manually performing the contact operation ("Boomer").

In order to automate the operation, this information must be supplied to the system of the tanker that controls the boom in order for it to modify the relevant "control laws" that control its motion. It can also be supplied for the tanker control and even for the receiver control. In this manner, the three can contribute to a convenient and safe automated operation. This operation is currently performed manually.

In-flight aerial refueling is currently performed in two different ways: with a probe-and-drogue or with a flying boom. In the case of the boom, the tip or nozzle (fuel outlet nozzle) of its tube must be inserted in a receptacle disposed on the surface of the aircraft that will be receiving the fuel. This entire operation is currently performed manually and depends on the expertise of the tanker operator or "Boomer".

In order to have accurate information of both points (tube tip and receptacle mouth), signaling devices and sensors capable of "seeing" those signals are normally used to determine the positions of both.

The following patents related to the object of the invention are known in the state of the art.

U.S. Pat. No. 6,752,357 describes a system for measuring the distance from a refueling aircraft comprising at least one telescoping refueling boom, at least one receptacle and a computer. The refueling tube is equipped with a nozzle. The geometry of the tube nozzle is suitable for connecting to an aircraft refueling receptacle. Each camera forms a plurality of images, both of the tube nozzle and of the refueling receptacle. The computer receives each of the images, converts the images to a plurality of pixels and analyses the images to determine a distance between the boom nozzle and the refueling receptacle. The tip of the refueling boom constitutes a fixed reference point between the mating end and the refueling aircraft. The fixation point of the aircraft's camera also forms a reference point of the camera.

U.S. Pat. No. 5,530,650 discloses a visual guidance system and a method, which includes a subsystem that locates both the structures of the aircraft and the mating structures thereof and also determines their motion and their rate of change of motion. The locating subsystem has an electrical output which feeds the location and motion data to a guidance system computer which uses software that combines the data with other data in a database containing the dimensional size and configuration of the aircraft and mating structures. The combined data are converted to a suitable format and fed to the computer monitor that displays the aircraft and mating structures thereof in real time during the refueling operation. The computer monitor has image controls which allow the operator to select the perspective viewing angle and image contrast and color in order to enhance the visual signals provided by the image to facilitate the refueling operation.

US2007023575: This patent discloses a viewing system for use in an in-flight aerial refueling tanker that does not require multiple cameras to provide a stereo image so that a boom operator may perform a refueling operation in a receiver vehicle.

US20110147528: This patent discloses a three-dimensional system for viewing a given scenario, making it possible to view different parts of the scenario in greater detail. It also seeks to provide viewing methods and systems for tanker aircraft to monitor receiver aircraft refueling operations, which enable viewing of selected zones of the refueling area in greater detail. The system comprises at least two high-resolution cameras for providing video signals of said scenario for stereo monitoring, at least one three-dimensional monitoring system for displaying three-dimensional images of said scenario and also comprises means for viewing zoomed three-dimensional images of a selected zone of the scenario.

U.S. Pat. No. 7,469,863: This patent discloses an automated refueling system and the associated methods, which has an input device for an operator, configured to receive inputs, and a first input signal corresponding to a position for an in-flight aerial refueling device. It also has a sensor positioned to detect the location of at least one of the refueling devices.

SUMMARY

The invention includes a method and a system for establishing, automatically or semi-automatically, contact between the nozzle or boom fuel supply device of a first tanker aircraft and the receptacle located on the surface of a second aircraft or receiver aircraft, which will receive the fuel from the first aircraft.

Another aspect of the invention is to provide the first aircraft, i.e. the tanker, with the location of the receiver aircraft and, more specifically, of its receptacle, with respect to a center of coordinates solidly connected to said tanker so that, once the second aircraft or receiver aircraft has approached and is in a suitable position to establish contact, it can receive the tube nozzle of the tanker aircraft and commence the transfer for the stipulated amount and time.

Likewise, another facet of this invention is to provide the system that governs the tanker aircraft's boom with the position of the nozzle located at the tip of the tube thereof with respect to the same center of reference of the preceding paragraph and, what is most important, the relative position between the outlet of the tanker aircraft's tube nozzle and the receiver aircraft's receptacle inlet.

As mentioned earlier, with these data the receiver aircraft can move to the suitable position of contact and, once positioned stably therein, waiting to receive the fuel, the tanker aircraft can know the position to which it must move the tip of its boom in order to insert the nozzle in the receiver aircraft's receptacle as a previous event to commencing fuel transfer.

In short, based on that information, the operation, as mentioned earlier, may become semi-automatic or automatic depending on the design of the control laws that govern the motion of the tanker aircraft's boom and even that of the tanker and receiver aircraft, in accordance with said information. Obtaining and supplying that information is the objective of this patent.

In general, it is not too inconvenient to be able to position said sensors on the tanker aircraft's tube; however, this is not the case of the receptacle of the receiver aircraft, which in some cases may not even belong to the same air force or country as the tanker aircraft. This problem is solved by the present invention, which does not require installing sensors on the receiver aircraft.

It is also important that the system that makes it possible to obtain the locations of both the tube tip and the receptacle mouth is a robust system and makes it possible to securely provide said information at all times, regardless of the instant, on the position or light or other environmental conditions. This is, however, achieved with the present system by means of multiple sensorization (or installation of sensors and emitters for obtaining information) based on different technologies, makes it possible, by combining them, to obtain reliable and robust results at all times.

The present invention develops an automated system for placing the boom in contact with the receiver aircraft for in-flight aerial refueling, that does not require installing signaling devices on said receiver aircraft, wherein the system and the associated method is robust, redundant and ensures the provision of said information, regardless of the instant, developing a system and a method such as that described below.

Additional basic differences of this invention with respect to other inventions are:

The existence of an active device on the tube to determine its exact, precise and reliable position with respect to the tanker aircraft.

That said device generates an optical signal and, therefore, undetectable except by vision cameras operating on the same wavelength, in addition to being in certain locations with respect to the tanker aircraft and at a very short distance.

The existence of different sources for obtaining the same information on the position of the receiver's receptacle and even more sources for obtaining information on the situation of the tube mouth (high redundancy).

The use of neural networks to process part of the information, in addition to conventional algorithms, to obtain results.

BRIEF DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

DETAILED DESCRIPTION

Figure 1:
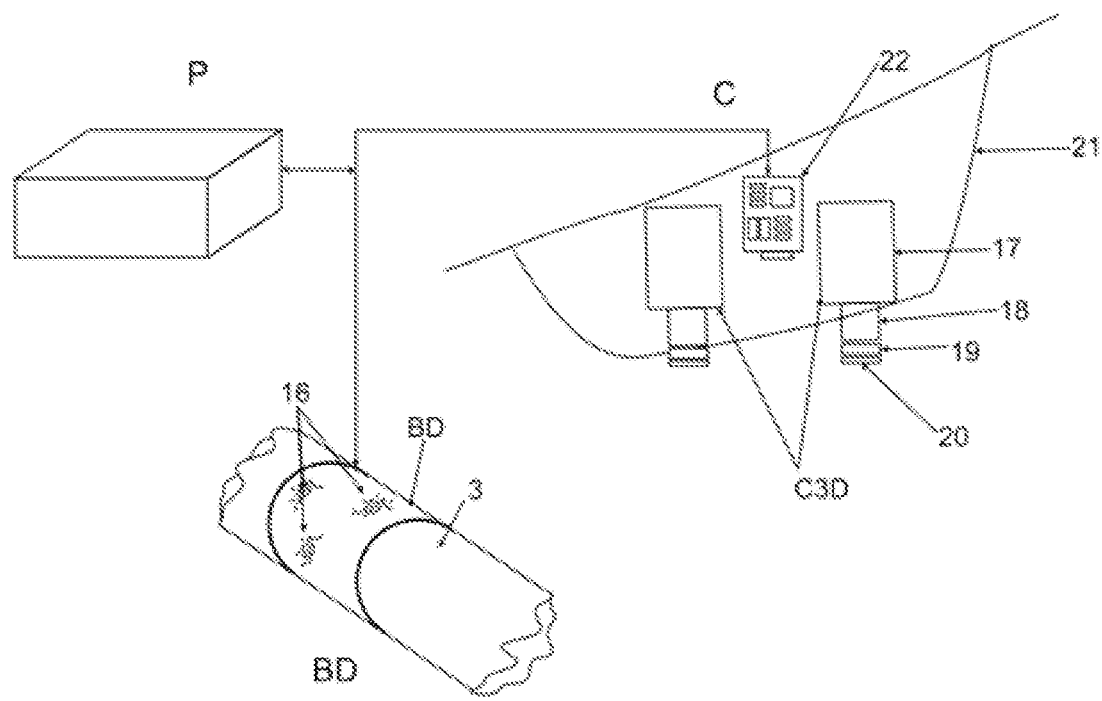
In FIG. 1, BD is a simplified representation of the device (13) which is disposed at the tip of the telescoping part of the boom (6) tube (3), in the zone as nearest as possible to the fuel outlet nozzle. P represents the processing element (21) that generally goes inside the aircraft. (14) is the casing wherein the S3D (9), STOF (12) and SDOE (10) subsystems are housed, in the event of being in the chosen embodiment, each with its corresponding optional ancillary components. In the figure, this casing only houses subsystem S3D, while in FIG. 2 below the three subsystems are represented schematically.

As mentioned earlier, the system seeks to establish contact between the tube tip, or nozzle, and the mouth of the receptacle, automatically or semi-automatically, i.e. provide the tanker aircraft with the position of the receiver aircraft with respect thereto and, even more importantly, the relative position between the tanker aircraft's tube nozzle outlet and the receiver aircraft's receptacle tube mouth. Once the positions of the tube nozzle, the receptacle mouth and pointings thereof are dynamically determined, over time, with respect to common axes, this information may be supplied to the Control Laws of both the receiver and tanker and of its boom and establish the automatic contact.

The system comprises three basic elements or parts:

I. A BD element (which we will call Boom Device) composed of a holder casing attached to the tube tip. A set or subsystem of light emitters is disposed on the surface thereof. In a preferred embodiment, these emitters consist of LEDs, together with their connection/disconnection electronics.

II. A C element formed by a box attached to the outer surface of the aircraft, preferably on the tailcone, and which houses the following three subsystems:

1. A 3D vision subsystem formed, without loss of generality, by a left camera and another right camera that generate a 3D view of the working scenario (which we will call 3D subsystem: S3D). This S3D subsystem, together with its electronics, controls the alternative connection of the BD emitters and makes it possible, by processing both images, to obtain the spatial position of said luminous BD elements. Also, by means of image processing based on segmentation, it obtains the position of the receiver aircraft's receptacle.

2. A subsystem we will call STOF, composed of a TOF (Time Of Flight) type camera, with the peculiarity that it measures the time it takes a light impulse generated and reflected on the different objects of our working scenario, from the moment it leaves our generator thereof to the moment it reaches each pixel of the image sensor used. The STOF subsystem also has electronics, a laser with its diffuser, a lens and a narrow bandpass filter F1 to eliminate light other than that used to excite our scenario. Here the electronics have a main functionality, that of calculating the round-trip time of the photons output by the laser emitter L1, which also forms part of this subsystem, and which bounce off the objects around the aircraft to return to each camera pixel. These electronics will be equally responsible for firing the laser light pulses. Obviously, the laser L1 wavelength λ1 is the same as the central wavelength of the filter band F1 of the TOF camera.

3. A subsystem, which we will call SDOE, composed of a camera which has, before reaching its sensor, a narrow bandpass filter (20) which allows the passage of only those wavelengths (λ2) which are very close to those generated by a laser L2 that also belongs to the subsystem. In this document we will refer to said camera as being of the DOE type due to the objective it pursues. Its mission is to detect the points of light of a known pattern, created when the light from the laser L2 is reflected on our scenario when made to pass through a DOE (Diffractive Optical Element) lens, engraved with said pattern. The camera of this SDOE subsystem is composed of its electronics, image sensor, lenses and narrow bandpass filter F2. The filter is tuned, as mentioned earlier, at a wavelength λ2, which is the central wavelength of the laser L2 emission wavelength. The camera electronics are capable of detecting the aforementioned light pattern on the objects around us and, based thereon, through triangulation and trigonometry, determining the relative distances thereto of the constituent points thereof.

III. A processing element we will call P. This element has two parts: one composed of a combination of processors, of both the conventional type, which execute instructions sequentially (such as multi-core processors or FPGAs (Field-Programmable Gate Arrays) and GPUs (Graphics Processor Units)) and another with other processors based on neural networks with learning and parallel processing ability. Additionally, the P element is composed of a subsystem of communications with the other subsystems that compose the invention. The functions of the P element consist of obtaining, on the one hand, the position of the receiver and, on the other, the location of the boom from the information provided by the S3D, STOF and SDOE subsystems. Among other results, the P element obtains a point cloud of the receptacle and parts annexed thereto of the receiver aircraft. Knowing this point cloud and comparing it with information stored in a database, of the 3D models of the possible aircraft to be contacted, a 3D model of the receiver can be placed in a virtual space and, based thereon, obtain the exact position of the receptacle thereof. The point cloud is also made to pass through a previously trained neural network in order to finally obtain the position of the receptacle once again (redundantly). It will do the same with the data of the point clouds and the 3D model of the boom. Another function performed by the P element is to determine the positions of the emitters of the BD element of the tube nozzle to obtain the position of the tip thereof. The P element calculates all the significant points and vectors mentioned earlier. It also adjusts dimensions and eliminates aberrations from the lenses or from the sensor itself. Prior calibration will be indispensable for the proper functioning of the entire system. The components of the P element may be concentrated in a single location or dispersed in parts together with the other subsystems of this invention.

In a first instance, only the 3D cameras perform the necessary functionalities. The system would be reduced to two cameras and the BD light emitter device installed on the tube tip. All with their corresponding accessories and to which the processing element P would have to be finally added.

In a second, more complete embodiment, all the subsystems are present, although in a first embodiment, the laser used by some subsystems may be the same and the functionality of its cameras performed by one of the 3D cameras or by both.

In successive embodiments, the components of each subsystem become increasingly autonomous and specialized in the task required by each specific subsystem and the whole system adds more individual elements until arriving at the most complete embodiment, with two lasers and all the cameras independent therebetween.

The whole system, in any of its embodiments, will be fed by a power supply of the aircraft and will output a set of coordinates ($X_i$, $Y_i$, $Z_i$) of the key points and of the orthogonal versors ($V_{ix}$, $V_{iy}$, $V_{iz}$) that it locates in each frame. Additionally, all the electronics, which can be considered part of the P element, incorporate a subsystem of communications for exchanging information with the other subsystems.

All the S3D, STOF and SDOE subsystems will generate point clouds based on the calculated distances and will have electronics with embedded algorithms capable of pre-processing the information received from their cameras and send it to the rest of the processing P element it obtains from those points, the location of the receiver aircraft's receptacle and the location of the boom tip based on its 3D models once embedded in those point clouds obtained.

Unless indicated otherwise, all the technical and scientific elements used in this specification have the meaning usually understood by the ordinary person skilled in the art to which the invention belongs. In the practice of the present invention, similar methods and materials or equivalent to those described herein may be used.

The use of different combinations of the basic system, with the S3D, and the STOF and SDOE subsystems constitute, in essence, the different claims included herein.

Throughout the description and the claims, the word "comprises" and its variants are not intended to exclude other technical characteristics, additives, components or steps. For the persons skilled in the art, other objects, advantages and characteristics of the invention will be partly inferred from the description and partly from the practice of the invention.

The system is formed by the following three elements.

I. A first element (FIG. 1) we call BD which is installed in the zone of the boom (6) tube (3) tip as a ring that grips it and consists of a casing that protects the electronics and that holds a set of light emitters, which may consist, without loss of generality, of LEDs (16) or laser diodes with their respective diffusers. Said emitters are disposed on its surface and emit light homogeneously, at certain times, which will be detected by a set of cameras (9), whose mission is to determine the position of said light emitters with respect thereto. The electronics (22) consist of an adaptation of the aircraft's power supply, a set of drivers or adapters for connecting the light emitters and a communications subsystem that will receive orders from the electronics that govern the aforementioned cameras for the purpose of achieving a certain synchronization between both subsystems (cameras and LED emitters).

Figure 2:
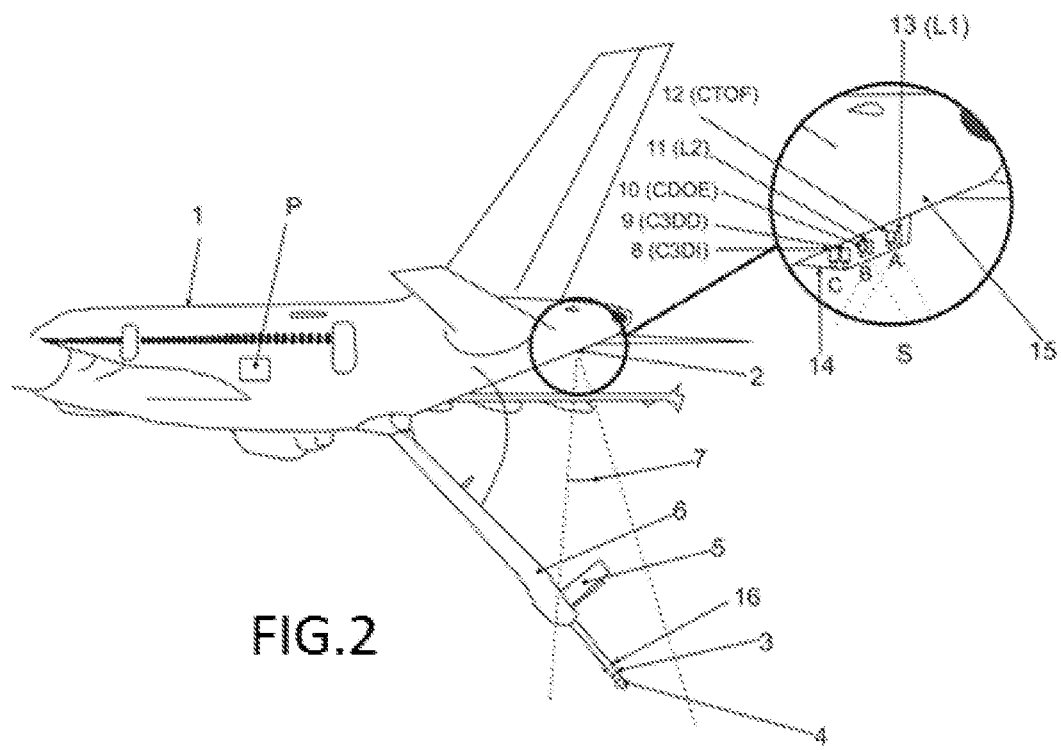
In FIG. 2 we can observe a simplified representation of the elements that form part of the invention, in its most complete embodiment and how they can be disposed (2) under the tailcone (11) of the tanker aircraft where the viewing angle (7) is the minimum necessary to perform the operations. Here the boom (6) extends from the tanker aircraft (1) from its tailcone (11) secured by means of a ball-and-socket joint (8) and has fins (5) that control its motion. The tube (3) emerges from the flying boom, at whose tip the BD element (13) is disposed, anterior to the fuel dispensing nozzle (4).

II. A second element (detailed in FIG. 2), which we call C, formed by a second box or casing (14) that houses the other subsystems of this invention, including part of the final P processing element (FIG. 2) and element that interfaces with the aircraft system where the control laws are located. This C element is disposed in a preferred embodiment, under the tailcone (11) of the tanker aircraft (1), notwithstanding that the same subsystems that integrate it may be dispersed, disposed in different zones of the tanker aircraft in different embodiments of the same patent.

Within the C element we have up to three different subsystems, depending on the specific embodiments of this patent:

1. Firstly, a first subsystem we will call S3D (9), which contains the 3D cameras (17) and is responsible for locating the LEDs of the BD element described in point I (FIG. 1) and for determining the position of said emitters opposite them. It is also responsible for determining the position of the receptacle based on the images obtained from the receiver aircraft on whose surface it is located. These cameras have their respective image sensors, processing electronics, focus lenses (18) and a narrow bandpass filter B3 centered in a place $\lambda 3$ on the spectrum. Some cameras may have variable electronic control lenses (19). This wavelength is compatible with the other cameras involved in the refueling operation and is centered on the same emission wavelength of the LEDs (16) of the BD element. This will help to eliminate photons from other sources such as the sun itself. The additional electronics also have the mission of controlling the connection of the LEDs over time, generating certain patterns that also help to distinguish the light emitted by other sources. Processing consists, in essence, of performing a cross-correlation between the light pattern generated and the light received in each frame. Lastly, these electronics, after detecting each LED emitter of the BD element which is visible to the cameras, calculates the distance and the other coordinates of each LED with respect to a set of reference axes which, for the sake of simplicity, are disposed in the center of the sensor of one of the cameras and which we call RC. The S3D subsystem will be fed by a power source of the aircraft and will output a set of coordinates (X, Y, Z) of the active points it locates on each frame. The processing electronics will encompass functionalities such as the detection of coordinates (x, y) of each active point located by each camera independently, in addition to the calculation of the global coordinates with respect to the reference axes with RC on those (x, y) of both cameras. It will also adjust the dimensions and eliminate aberrations from the lenses or from the sensor itself. A prior calibration will be indispensable for the proper functioning thereof.

The calculation of the distance is performed by each frame time interval, using the images obtained by both cameras at the image obtainment frequency thereof. Additionally, by identifying a set of points in both, we can obtain the distance from each point thereto by means of triangulation, thereby obtaining a point cloud of our receiver aircraft and of our boom, provided that there is no geometric interference and they are seen by two cameras.

3D cameras are each equipped with some (or all) of the following ancillary elements:

Lenses (18)

Electronics for elimination of aberrations and dead pixels, image enhancement and calculation of coordinates (x, y) of the LEDs of the BD element and of the receptacle.

Additionally, in a more complete embodiment of this same patent, C may house any of the following subsystems:

2. A second subsystem containing a TOF (Time of Flight) type camera, with the peculiarity that it measures the time of a light pulse generated and reflected on the various objects of our working scenario, from which said pulse is output by our generator thereof, until it reaches each pixel of the image sensor used. This subsystem, which we will call STOF, has electronics, a focus lens and a narrow bandpass filter B1 to eliminate light other than that used to excite our scenario. Here, the electronics have the functionality of calculating the round-trip time of the photons output by a laser emitter L1 and which bounce off the objects around the aircraft to return to the camera. These electronics will be equally responsible for firing the light pulses of L1. These calculations will be performed for each pixel or point of the sensor of the TOF camera. Obviously, the wavelength $\lambda 1$ of the light of L1 is the same as the central wavelength of the filter B1 of the camera of the STOF subsystem (12). The laser will be accompanied by a light expanding lens generated to illuminate the entire working scenario, although in a particular embodiment this lens may be a diffraction lens that only emits light to certain points of our working scenario. The result is a cloud of the same number of points as pixels of the TOF sensor, which give the distances from the light emitter to a specific point of the scenario which is focused on the corresponding pixel.

3. A third subsystem which we will call SDOE (10), composed of a camera equipped with electronics and optics that include a narrow bandpass filter at a wavelength that coincides with that of a laser emission. The laser is also equipped with lenses, including a DOE (Diffractive Optical Element). When the laser emission passes through the DOE lens, the light is diffracted, creating a specific pattern previously engraved on said lens. The mission of this SDOE subsystem is firstly to detect with the camera, which we will call DOE-type camera, the points of light reflected on our scenario and generated as a result of the structured lighting generated. The laser L2 of wavelength $\lambda 2$ is connected and disconnected at controlled periods to facilitate the detection of the points illuminated by the pattern generated. The DOE camera is composed by its electronics, image sensor, lenses and narrow bandpass filter B2 tuned at $\lambda 2$. Once the points are detected, the electronics determine the relative distances of the points illuminated and received in the pixels of the camera as the second part of the mission of this subsystem. This is performed by means of triangulation, measuring the displacement generated in accordance with the distance and knowing the separation between the laser and the camera used. As mentioned earlier, the wavelength $\lambda 2$ of the light of L2 is the same as the central wavelength of the bandpass filter B2 of the SDOE subsystem camera. The result is therefore a point cloud corresponding to those detected in the sensor on being reflected, from our structured illuminator.

The subsystems described in 2 and 3 are composed of the TOF and DOE cameras and by the laser emitters L1 and L2. In addition to other ancillary components and all the electronics that govern them.

III. A third element (P), which we will call processing element 21, that will be located in a box in the interior of the tanker aircraft (1) (part of which can be considered to be distributed among the electronics of the other components of this invention), whose mission is, based on the information provided by subsystems 1, 2 and 3, to generate the following information (relating to axes of common coordinates):

Vector position of point P1 of the tube tip=OP1;
Versor orthogonal to the surface that closes the tube nozzle=VO1;
Position vector of point P2 disposed at the tip of the receptacle mouth=OP2;
Versor orthogonal to the surface that closes the receptacle mouth=VO2;
Vector of relative velocity between P1 and P2=VR;
Vector of relative acceleration between P1 and P2=AR.

In addition to any others that could be of interest and can be obtained from the information generated by said subsystems.

One of the main functions of the P element is to obtain the point clouds generated by the previous subsystems 1, 2 and 3 in order to determine the previously specified values based thereon. The information processing that P may perform is based on the use of two different groups of processors and, therefore, calculation paradigms which are indicated below. On the one hand, traditional processors, understanding as such the most conventional, based on micro-programmed logic with a set of instructions, which are executed sequentially, or based on high-speed hardware such as FPGAs or GPUs. Furthermore, they are based on neural networks. Additionally, the P element is composed of a subsystem of communications with the other subsystems that compose the invention. Therefore, P is in charge of obtaining the significant data of the receiver aircraft's receptacle and of the boom tip, based on the point clouds obtained by the cameras of the different subsystems integrated in C.

The P processing element also has a memory that houses a database of 3D models of the different receiver aircraft with which the refueling will be performed, in addition to geometric 3D boom information. In the case of traditional processors, P adjusts the 3D models with the values of the point clouds thus obtained and, thus, arranges said 3D models in a virtual space and determines the positions of the aforementioned values and points of interest. In the case of the neural network, the desired values are obtained after training with different real refueling situations.

The previously generated data provide the system that governs the tanker aircraft's laws and those of its boom with adequate information to establish the correct strategy that will give rise to the approach and desired subsequent contact between the tube nozzle and the receptacle mouth. The two processing options can be used in combination or isolated to process the information generated by the different data collection subsystems.

The automated contact system operating procedure that is the object of the invention comprises the following stages:

Determining the position of each light emission point of the BD element, solidly connected to the end of the tube nozzle, using the 3D cameras. The light emission by these emitters is uniform in the emission directions and allows the 3D cameras to "see them", thereby determining the position of each of with respect to RC. In order to facilitate this work, the emitters are made to flash in certain patterns alternately and synchronized with the 3D cameras, and temporarily filtered with respect to the other LEDs. This avoids unnecessary overlappings between the emitters and facilitates detection using cross-correlation techniques to eliminate confusions with other points of light. The reflections can also be eliminated through the alternative and synchronized connection of the emitters. This synchronism makes it possible to minimize the energy required for detection. The use of a filter tuned at the wavelength of the light of the emitters also enables an increase in the signal/noise ratio, facilitating said detection once again. Once at least three emitters have been detected, the position of the tube tip point is obtained by means of a simple algebraic calculation based on a triangulation. This is possible because we know the distance between the cameras, the orientation and the focal distance therefrom. In this manner we can calculate the spatial coordinates of those emitters with respect to a Reference Centre (RC). Additionally, the coordinates of three adequate points will give us the exact position of the location of the nozzle center. This is performed with subcentrimetric precisions. Additionally, the vector perpendicular to the surface that closes the "nozzle" (4) is also obtained. This provides a first source of information corresponding to the boom tip with respect to the RC included in the C element.

The light emitters may be differently colored, alternating one "color" or another or emitting both in accordance with the convenience of being seen by one camera or another or both.

The light emitters are of the LED or laser type and consist of quasi-spheres, where The emission of light by these quasi-spheres is uniform in all emission directions and allows the 3D cameras to "see them" and thus determine the position of each of these spheres with respect to the RC.

The light emitters will be made to flash in certain patterns alternately and synchronized with the 3D cameras, and temporarily filtered with respect to the other light emitters.

Light emitters are two-toned, alternating one "color" or another or emitting both in accordance with the convenience of being seen by one camera or another or both.

Obtaining a first point cloud through the identification of specific points in both cameras. The image of the boom tip and that of the receiver aircraft positioned below it are subject to processing consisting of segmentation and recording to identify the same points in both frames from both cameras at any given time. Based on their positions in at least two cameras and through a triangulation method similar to that used to detect the light emitters in the preceding section, the coordinates of all the points identified in all the S3D cameras are obtained. This set of coordinates is no other than the point cloud with respect to the C we aim to achieve. It should be noted that two joined point sub-clouds are obtained: one corresponding to the boom tip and another corresponding to the receiver aircraft.

Obtaining a second point cloud corresponding once again to the boom tip and to the receiver aircraft as of the STOF subsystem, L1 together with the other ancillary components. The laser L1 provides a set of light pulses of wavelength $\lambda 1$. The circuit that triggers the connection of this laser is the same as that which governs the firing and acquisition of frames from the TOF-type camera included in STOF. Considering the velocity of the light and the time it takes to receive the pulse generated in each pixel of the sensor of said TOF-type camera, the distance from the point of the scenario that reflects the light received can obtained. To facilitate this task, a narrow bandpass B1 centered on $\lambda 1$ is anteposed to the TOF-type camera. Additionally, the phase displacement technique is used to accurately determine the moment in which the pulse emitted by L1 returns to the sensor. This is performed for each point of our scenario, which is received in each pixel of our sensor in the TOF camera. A new cloud is thus obtained with the same number of points as the resolution of the sensor used. The TOF-type camera provides a new point cloud for each frame time.

Obtaining a third point cloud corresponding once again to the boom tip and the receiver aircraft based on the information it provides in a very similar manner to the foregoing, the SDOE subsystem formed by the DOE-type camera plus the laser L2 and other ancillary components. The laser L2 generates a structured light pattern (this pattern may be fixed or variable depending on how the other laser lenses are controlled) by means of the diffraction lens, due to which it is made to pass once, adequately collimated. The elements of this pattern can be identified if we are capable of "seeing" the light emitted by the laser on being reflected by our environment. To facilitate this, we use a new narrow bandpass filter B2 in front of the SDOE camera, tuned with L2 and which will eliminate the light of other wavelengths. Additionally, connection/disconnection with a certain cadence will also help us to distinguish the light of the laser with respect to another, from different sources, which will not flash in the same manner. By using cross-correlation techniques we will obtain the pixels that are reflected onto the objects of our scenario and based on whose relative intensities we will determine what pixels correspond to certain points of the pattern. As a result, we obtain a set of patterns which, once again, by means of triangulation techniques and trigonometry, taking into account that we know the distance of the laser L2 to the SDOE camera and the angles of both, will allow us to obtain the distances from the SDOE camera to each point of this set of points. In short, we will have a set of coordinates $(x_i, y_i, z_i)$ belonging to the objects of our scenario for each frame. Therefore, once again we will have a point cloud similar to that obtained by the STOF camera but in a different way.

The next step is, alternatively, either to merge the information of the point clouds, for each frame, to obtain the best initial point cloud, or apply one of the processing methods (which will be explained later) of those among which P can perform, to each of the point clouds, to merge the results obtained and achieve the best and most robust solution of the position of the points and vectors of interest. As mentioned earlier, all this for each frame over time. The calculation of the relative velocities and accelerations, in addition to the indicated orthogonal versors is a merely algebraic question that requires little processing resources. The processing we can perform in P on the point clouds obtained by the different elements that integrate this invention consists of:

Making them pass through an artificial neural network trained to provide the coordinates of the location and orthogonal vector of the two points of interest with respect to our reference center RC as outputs.

Comparing them with one of the stored 3D models of our receiver and of the boom to ascertain the position of both the refueling mouth of said receiver and the center of the tube nozzle tip (4) once separated. Said points with respect to our reference center RC. The high degree of certainty provided by the BD element when obtaining the position of the boom tip allows us to eliminate the part of the point cloud corresponding thereto and to keep the sub-clouds corresponding exclusively to the receiver aircraft.

The stages through which the P element passes, in the event of making a comparison between the point clouds and one of the stored 3D models, are the following in the case of conventional processors:

1. Comparison of the point clouds received by any of the preceding methods, with the 3D representation of the aircraft model to which fuel will be supplied fuel and that of the Boom in order to find coincidences between point clouds and 3D models, thereby determining the exact spatial position with respect to the center of coordinates RC.
2. Upon ascertaining the spatial position, the virtual model of the aircraft is disposed in its theoretical position in space. This makes it possible to see the surface of our 3D model above the real image.
3. Upon virtually disposing the 3D model in our working scenario, the location of the receptacle mouth and other significant data are known. This makes it possible to arrange these points of interest in their spatial location with respect to the center of coordinates RC. During the testing phase, this makes it possible to observe the difference between the real position of the receptacle and that predicted by the 3D model and is of special interest because it shows any error that may exist in said phase in an obvious manner.

Furthermore, the stages through which the P element passes in the case of processing the point clouds, making them pass through an Artificial Neural Network are as follows:

1. Training the neural network through the introduction of point clouds and verification of the outputs to determine and return the erroneous information to the network in order to be able to train it (this phase is called training phase).
2. Once trained, in the recognition phase, it may be provided with new point clouds, to which it will respond with the values that the Network consider most probable of the trained points of interest.
3. Supervision of the data emitted by the Neural Network to avoid inconsistencies.

For both types of processing, there is a final task to be performed consisting of:

4. Merging the information obtained by means of alternative methods to obtain the information of interest in a robust and reliable manner and be able to feed the boom control laws and perform the automated refueling operation. In order to carry out this task, each subsystem is assigned the calculation of certain values known as quality factors and which indicate, in essence, the degree of reliability of the results they have provided or the probability of error. This information is used to guarantee the optimum merger of the results obtained.

The point clouds obtained by the S3D, SDOE and STOF subsystems are used in a hybrid calculation using the two indicated methods, i.e. it will jointly use neural networks and comparison with a 3D model to obtain the positions and vectors of interest.

Therefore, the system and method of this invention provide a mechanism for obtaining a set of time-based data, with negligible latency and at an adequate rate, to allow the system that governs the control laws of the tanker and boom thereof, in addition to the receiver aircraft, to incorporate said data in its control and thus govern the tanker, the boom and the receiver to give rise to a contact between the last two semi-automatically or even automatically, supervised or unsupervised.

Having sufficiently described the nature of the present invention, in addition to the manner in which to put it into practice, it is stated that, within its essentiality, it may be put into practice in other embodiments that differ in detail from that indicated by way of example, and which will fall under the scope of the protection applied for, provided that it does not alter, change or modify the essential principal thereof.

The invention claimed is:

1. A system for detecting the tube tip and receptacle mouth for an in-flight aerial refueling system with a flying boom, comprising the three following elements:
    A BD element composed of a holder casing attached to the tip of the boom tube, disposing on the surface thereof a set of light-emitting elements which are LEDs, laser emitters or similar and the associated electronics for connection and control thereof;
    A C element formed by a box or casing attached to the outer surface of the tanker aircraft, preferably on the tailcone, with electronics that govern the foregoing set of light emitters and also a pair of 3D vision cameras in charge of detecting the light emitters of the receptacle of the receiver aircraft to obtain the coordinates (X, Y, Z) of the center of each light-emitting point and other points of interest with respect to a common center of coordinates, both cameras being equipped with a narrow bandpass filter, tuned at the wavelength of the light emitters; and
    A processing element P of information and calculation, wherein each of its 3D cameras is equipped with some (or all) of the following ancillary elements:
    Lenses
    Electronics for elimination of aberrations and dead pixels, image enhancement and
    calculation of coordinates (x, y) of the LEDs of the BD element and of the receptacle, characterized in that the P processing element of information and calculation is composed of: either traditional processors, understanding these to be the most conventional, based on microprogrammed logic with a set of instructions, which are executed sequentially, or composed of high-velocity hardware such as FPGAs or GPUs, or those based on artificial neural networks, the latter with parallel processing capacity; additionally, the P subsystem is composed of an element of communications with the other subsystems that compose the invention, or of a combination of all the foregoing.

2. A system for detecting the tube tip and receptacle mouth for an in-flight aerial refueling system with a flying boom, according to claim 1, characterized in that the P processing element has a memory where it houses a database of 3D models of the different receiver aircrafts with which the refueling will be performed, in addition to geometric 3D information on the tube with which to compare the information obtained from the cameras.

3. A system for detecting the tube tip and receptacle mouth for an in-flight aerial refueling system with a flying boom, according to claim 2, characterized in that the processing unit has the functionality of comparing the images obtained by synchronous frames of both 3D cameras and identifying a set of points in each.

4. A system for detecting the tube tip and receptacle mouth for an in-flight aerial refueling system with a flying boom, according to claim 2, characterized in that the DOE-type camera is independent from the 3D cameras, due to which the system will have a total of three cameras.

5. A system for detecting the tube tip and receptacle mouth for an in-flight aerial refueling system with a flying boom, according to claim 1, characterized in that the boom refueling contact operation is performed with the additional components detailed below:
    A DOE-type camera that detects the photons that reach their image sensor on being reflected by the different objects of the working scenario, where the DOE camera is composed of its electronics, an image sensor, focus lenses and narrow bandpass filter B2, tuned at the wavelength of the coherent light emitted by a laser L2;
    A laser L2 equipped with a DOE diffraction lens whereon a certain pattern has been engraved which is projected on the surroundings upon passing through said DOE lens; wherein the DOE-type camera is, or coincides with, one of the 3D cameras.

6. A system for detecting the tube tip and receptacle mouth, according to claim 1, with the additional components detailed below:
    A TOF or time of flight type camera composed of electronics, a lens and a narrow bandpass filter B1 for eliminating light other than that used to excite the scenario;
    A laser L1 synchronized with the light source by the camera, said laser having ancillary elements such as a collimator and a lens for expanding the light generated, wherein the TOF-type camera is, or coincides with, one of the 3D cameras.

7. A system for detecting the tube tip and receptacle mouth for an in-flight aerial refueling system with a flying boom, according to claim 6, characterized in that the TOF-type camera is independent from the 3D cameras, due to which the system is composed of a total of three cameras.

8. A system for detecting the tube tip and receptacle mouth for an in-flight aerial refueling system with a flying boom, according to claim 6, characterized in that it comprises the DOE-type camera and TOF-type camera, in addition to their respective lasers.

9. A system for detecting the tube tip and receptacle mouth for an in-flight aerial refueling system with a flying boom, according to claim 8, characterized in that both the DOE- and TOF-type cameras are independent from the 3D cameras, due to which the system will have a total of four cameras.

10. A system for detecting the tube tip and receptacle mouth, according to claim 9, characterized in that the DOE-type camera has a first laser L2 of wavelength $\lambda 2$, to which we have added a diffraction lens that generates a structural light pattern and because the TOF-type camera has a second laser L1 of wavelength $\lambda 1$ which is the same as the central wavelength of the narrow bandpass filter B1 of the TOF-type camera, due to which the system has two lasers.

11. A system for detecting the tube tip and receptacle mouth for an in-flight aerial refueling system with a flying boom, according to claim 10, characterized in that any of its cameras have variable electronic control.

12. A method for establishing automated contact for an in-flight aerial refueling system, according to the system of claim 1, characterized in that it comprises the stages of:
    Determining the position of each point of light from the LED emitters, solidly connected to the tip of the boom nozzle, by means of the 3D cameras;
    Obtaining, at least, one point cloud corresponding to the boom and its tip and the receiver aircraft based on, at least, one of the following sets of elements:

a) Of a set formed by a DOE-type camera plus a laser and other ancillary elements, wherein the laser generates a light pattern thanks to the structured diffraction lens through which it is made to pass, the elements of this pattern may be identified with the help of a narrow bandpass filter tuned at the wavelength of the laser, which will eliminate the light of other different wavelengths, likewise, connection/disconnection with certain cadence will also help us to differentiate the laser light with respect to that of other different sources and, using cross-correlation techniques and digital filtering, to obtain the pixels that are reflected in the elements of our scenario, the result is a set of 2D points with which, by means of simple triangulation techniques and trigonometry and considering the distance from the laser to the DOE-type camera, we can obtain the distances from said camera to this set of points, upon calculating these distances, the result, per frame, is therefore a set of 3D coordinates $\{(x_i, y_i, z_i)\}$ corresponding to points that belong to our scenario which have reflected the photons from our laser;

b) Of a set formed by a TOF-type camera, a laser and other ancillary elements, the laser provides a set of light pulses of a certain wavelength, the circuit that triggers the connection of this laser is the same that governs the firing and acquisition of TOF-type camera frames, considering the velocity of the light and the time it takes to receive the pulse generated in the TOF-type camera sensor, we can obtain the distance from the points of the scenario that reflect the light emitted, in order to facilitate this task, a narrow bandpass filter centered on the laser wavelength is put before the TOF-type camera, in each frame time, the TOF-type camera provides a point cloud $N=\{(x_i, y_i, z_i)\}$ which corresponds to the distances to those of our scenario which have reflected the light generated by our laser;

c) Of the set formed by the two 3D cameras which, by using significant points in both images, make it possible to identify a point cloud for both cameras and start from both positions (of each camera) for each point and, using triangulation techniques and trigonometry, obtain the distances therefrom to a reference system RC (for example, centered on the sensor of one of the cameras);

Performing, through the electronic processing system P, one of the two following functions with the point cloud or clouds obtained:

a) Introducing the set of points as inputs to a previously trained artificial neural network to obtain the outputs corresponding to the three coordinates of the center of the receptacle mouth, the three coordinates of a vector orthogonal to the surface that closes said mouth, the three coordinates of the tube nozzle and the three coordinates of the vector orthogonal to the closure of said nozzle;

b) Comparing this set of points to a 3D image of the surface of the boom and of the receiver aircraft, stored in the corresponding database, until achieving their match, i.e. until we find the correspondence between the real points of our receiver of the cloud obtained with those of the stored 3D models of our aircraft and boom; at that point, and based on the 3D receiver aircraft model, we can obtain the exact location of the receptacle mouth and tube nozzle, in addition to the vectors orthogonal to the closures thereof and dispose them in our scenario again with respect to a same center of coordinates RC;

Performing a data merger with all the results obtained in all the foregoing methods for obtaining the best position of both points of interest and the perpendicular vectors of the surfaces that close both conduits, all this for each frame over time;

Calculate the relative velocities and accelerations of the points of interest found.

13. A method for establishing automated contact for in-flight aerial refueling with a boom, according to the system of claim 12, characterized in that the point clouds obtained by the S3D, SDOE and STOF subsystems are used in a hybrid calculation with the two procedures indicated in said claim, i.e. it will jointly use neural networks and compare them to a 3D model to obtain the positions and vectors of interest.

14. A method for establishing automated contact for in-flight aerial refueling with detection of the tip of its tube, according to claim 13, characterized in that the light emitters are of the LED or laser type and consist of quasi-spheres, where The emission of light by these quasi-spheres is uniform in all emission directions and allows the 3D cameras to "see them" and thereby determine the position of each of these spheres with respect to the RC;

The light emitters will be made to flash in certain patterns alternately and synchronized with the 3D cameras, and temporarily filtered with respect to the other light emitters;

Light emitters are two-toned, alternating one "color" or another and emitting both in accordance with the convenience of being seen by one or another camera or both.

* * * * *